US012674432B2

(12) United States Patent
Froihofer et al.

(10) Patent No.: US 12,674,432 B2

(45) Date of Patent: Jul. 7, 2026

(54) HIGH-PRESSURE FUEL PUMP

(71) Applicant: Robert Bosch GmbH, Stuttgart (DE)

(72) Inventors: Thomas Froihofer, Brackenheim (DE); Rainer Kornhaas, Stuttgart (DE); Guido Bredenfeld, Friedrichshafen (DE); Stephan Wehr, Heiligenstadt (DE)

(73) Assignee: Robert Bosch GmbH, Stuttgart (DE)

(*) Notice: Subject to any disclaimer, the term of this patent is extended or adjusted under 35 U.S.C. 154(b) by 19 days.

(21) Appl. No.: 18/291,869

(22) PCT Filed: Jun. 9, 2022

(86) PCT No.: PCT/EP2022/065635

§ 371 (c)(1),
(2) Date: Jan. 24, 2024

(87) PCT Pub. No.: WO2023/006289

PCT Pub. Date: Feb. 2, 2023

(65) Prior Publication Data

US 2024/0360807 A1 Oct. 31, 2024

(30) Foreign Application Priority Data

Jul. 28, 2021 (DE) ..................... 10 2021 208 119.3

(51) Int. Cl.

*F02M 59/02* (2006.01)
*F02M 59/10* (2006.01)

(Continued)

(52) U.S. Cl.

CPC ........ *F02M 59/025* (2013.01); *F02M 59/102* (2013.01); *F02M 59/46* (2013.01); *F04B 19/04* (2013.01); *F04B 49/22* (2013.01)

(58) Field of Classification Search

CPC .......... F04B 19/04; F04B 49/22; F04B 49/24; F02M 59/025; F02M 59/102;

(Continued)

(56) References Cited

U.S. PATENT DOCUMENTS 6,135,090 A * 10/2000 Kawachi ............. F02D 41/3809 123/506

8,430,081 B2 * 4/2013 Mancini ................ F02M 59/46 123/457

(Continued)

FOREIGN PATENT DOCUMENTS

EP 2 344 749 B1 7/2011
JP 2007-218213 A 8/2007

(Continued)

OTHER PUBLICATIONS

International Search Report corresponding to PCT Application No. PCT/EP2022/065635, mailed Aug. 31, 2022 (German and English language document) (6 pages).

*Primary Examiner* — Charles G Freay
*Assistant Examiner* — Joseph S. Herrmann
(74) *Attorney, Agent, or Firm* — Maginot, Moore & Beck LLP

(57) ABSTRACT

A high-pressure fuel pump includes an inlet, which is in the form of an inlet port fixed to the pump housing, and a pressure-limiting valve that fluidically connects a high-pressure region to a low-pressure region and opens in the direction of the low-pressure region. The pressure-limiting valve opens in the direction of an inlet port chamber.

17 Claims, 11 Drawing Sheets

(51) Int. Cl.
*F02M 59/46* (2006.01)
*F04B 19/04* (2006.01)
*F04B 49/22* (2006.01)

(58) Field of Classification Search
CPC .... F02M 59/44; F02M 59/46; F02M 63/0005; F02M 63/005; F02M 2200/27
See application file for complete search history.

(56) References Cited

U.S. PATENT DOCUMENTS

| | | | | |
|---|---|---|---|---|
| 10,119,505 | B2 * | 11/2018 | Oda | F04B 53/14 |
| 2005/0205065 | A1 * | 9/2005 | Rembold | F16K 17/0406 123/446 |
| 2006/0222538 | A1 | 10/2006 | Inoue et al. | |
| 2007/0286742 | A1 * | 12/2007 | Inoue | F04B 49/035 417/269 |
| 2009/0252621 | A1 * | 10/2009 | Siegel | F04B 49/035 417/307 |

FOREIGN PATENT DOCUMENTS

| | | | |
|---|---|---|---|
| JP | 2008-157252 | A | 7/2008 |
| KR | 10-2107464 | B1 | 5/2020 |
| WO | 2006/069819 | A1 | 7/2006 |
| WO | 2010/049207 | A1 | 5/2010 |
| WO | 2019/015862 | A1 | 1/2019 |

* cited by examiner

HIGH-PRESSURE FUEL PUMP

This application is a 35 U.S.C. § 371 National Stage Application of PCT/EP2022/065635, filed on Jun. 9, 2022, which claims the benefit of priority to Serial No. DE 10 2021 208 119.3, filed on Jul. 28, 2021 in Germany, the disclosures of which are incorporated herein by reference in their entirety.

BACKGROUND

A high-pressure fuel pump is already known from the prior art, for example from EP 2 344 749 B1 of the applicant, with an inlet for supplying fuel, with an outlet for discharging compressed fuel, with a pump housing, with a delivery chamber disposed in the pump housing, with a pump piston which can be displaced in the pump housing along a longitudinal direction and which delimits the delivery chamber, with an inlet valve disposed between the inlet and the delivery chamber and which opens towards the delivery chamber, with an outlet valve which is disposed between the delivery chamber and the outlet and which opens away from the delivery chamber, with a high-pressure region which extends fluidically between the outlet valve and the outlet, with a low-pressure region which extends fluidically between the inlet and the inlet valve, and with a pressure-limiting valve which fluidically connects the high-pressure region to the low-pressure region and opens towards the low-pressure region, so that fuel flows out of the high-pressure region into the low-pressure region when the pressure difference between fuel in the high-pressure region and fuel in the low-pressure region exceeds an opening pressure, wherein the outlet valve is disposed in an outlet valve bore of the pump housing and the pressure-limiting valve is disposed in a pressure-limiting valve bore of the pump housing, wherein the inlet is formed as an inlet port fixed to the pump housing and an inlet port chamber of the low-pressure area is formed between the pump housing and the inlet port.

According to the above-mentioned prior art, it is provided that an outlet of the pressure-limiting valve is connected to a receiving chamber of a pressure damper of the high-pressure fuel pump belonging to the low-pressure region.

SUMMARY

The disclosure is based on the observation that the solution known from the prior art leads to a potentially excessive mechanical load on the pressure damper. As pressure pulsations from the high-pressure region pass through the pressure-limiting valve into the receiving region and act upon the pressure damper, which is actually only designed for low pressure, this causes wear and undesirable noise. In addition, the actual function of the pressure damper, to dampen pressure pulsations whose source lies in the low-pressure region of the high-pressure fuel pump, is impaired.

In order to minimize the mechanical stress or wear associated with the pressure-limiting function of the high-pressure fuel pump and, moreover, the generation of noise, it is therefore provided in accordance with the disclosure that the pressure-limiting valve fluidically connects the high-pressure region to the inlet port chamber of the low-pressure region and opens towards the inlet port chamber, so that fuel flows out of the high-pressure region into the inlet port chamber when the pressure difference between fuel in the high-pressure region and fuel in the low-pressure region exceeds an opening pressure.

On the one hand, the inlet port chamber can consist of or comprise the part of the interior of the port facing the pump housing. Alternatively, the inlet port chamber can consist of or comprise a recess in the pump body covered by the inlet port. It is also possible that the inlet port chamber consists of or comprises these two partial chambers.

In particular, it can be provided that the pressure-limiting valve bore and the outlet valve bore are oriented geometrically parallel to each other.

On the one hand, this facilitates machining, for example cutting, of the pump housing to produce the pressure-limiting valve bore and the outlet valve bore, as this machining can be carried out geometrically parallel to each other and thus, for example, even with the same tool and/or, for example, simultaneously.

On the other hand, this makes it easier to install the high-pressure fuel pump, as the bores associated with the pressure-limiting valve and the outlet valve are parallel to each other and the pressure-limiting valve and the outlet valve can therefore be installed easily, for example using the same tool and/or at the same time.

In a further development, it is provided that the outlet is designed as an outlet port fixed to the pump housing. In particular, the outlet port has a tubular basic shape and can, for example, be welded or screwed to the pump housing and also comprise means with which a high-pressure line can be tightly fastened to it, for example a thread or the like.

Furthermore, it can be provided that an outlet port chamber is formed between the pump housing and the outlet port. On the one hand, the outlet port chamber can consist of or comprise the part of the interior of the port facing the pump housing. The outlet port chamber can also comprise a recess in the pump body covered by the outlet port, and in particular consist of these two partial chambers. Alternatively, the outlet port chamber can consist of the recess in the pump body covered by the outlet port.

In a further development, it can be provided that the outlet valve bore and the pressure-limiting valve bore both extend from the outlet port chamber. This reduces the number of parts that make up the high-pressure fuel pump and the number of sealing points required in the high-pressure fuel pump.

Further developments of the disclosure may provide that the pressure-limiting valve bore is connected to the inlet port chamber by a low-pressure connection bore located in the low-pressure region. This means that the space available for the fluidic connection along which the pressure limitation takes place can be used more optimally.

The pressure-limiting valve bore and the low-pressure connection bore can, for example, lie together in one plane, in particular perpendicular to the longitudinal direction. This makes it easier to machine, for example cut, the pump housing to produce the pressure-limiting valve bore and the low-pressure connection bore, as this machining can be carried out in the same plane and therefore, for example, even with the same tool and/or, for example, simultaneously.

It can be provided that the pump housing comprises a pump body and a pump cover which are connected to one another, the pump body and the pump cover delimiting a damping region belonging to the low-pressure region, in which at least one diaphragm damper is disposed, and wherein a filter bore is provided in the pump body, which connects the inlet port chamber with the damping region and in which a filter element is disposed, through which the fuel flowing from the inlet port chamber to the damping region flows, wherein the low-pressure connecting bore and the filter bore intersect. In this way, in addition to its conventional function of feeding filtered fuel from the inlet port chamber into the damping chamber, the filter bore can fulfill the further function of feeding the fuel quantity controlled by the pressure-limiting valve to the inlet port range. The filter bore has a dual function, so to speak.

Alternatively, it can be provided that only the outlet valve bore extends from the outlet port chamber, but not the pressure-limiting valve bore. This has the advantage that the cross-section of the outlet port chamber through which the flow passes can be significantly reduced and thus also the cross-section with which the outlet port is attached to the pump body. This improves the reliability or pressure resistance with which the outlet port can be attached to the pump housing, because the cross-section with which the outlet port is attached to the pump body is proportional to the force acting upon the port when fuel is pumped under high pressure. The connection length along which the port can be attached to the pump housing along its circumference, on the other hand, is only proportional to the square root of the cross-section with which the outlet port is attached to the pump body. The reduction in the cross-section with which the outlet port is attached to the pump body, which is associated with the measure that only the outlet valve bore extends from the outlet port chamber, but not the pressure-limiting valve bore, therefore increases the ratio of the connection length along which the port can be attached to the pump housing along its circumference to the cross-section with which the outlet port is attached to the pump body. This means that the fastening of the outlet port can withstand higher pressures of the pumped fuel.

It can be provided, for example in a further development of this, that the pressure-limiting valve bore is closed on the side of its exit with a ball or a plug, wherein the outlet valve bore is connected to the pressure-limiting valve bore by a high-pressure connection bore located in the high-pressure region. Fluidic communication between the outlet and the pressure-limiting valve then takes place through the high-pressure connection bore only inside the pump housing. At the same time, a simple and reliable sealing point is realized by closing the pressure-limiting valve bore with a ball or a plug It can be provided, for example in a further development of this, that the pump housing comprises a pump body and a pump cover which are connected to one another, wherein a damping region belonging to the low-pressure region, in which at least one diaphragm damper is disposed, is bounded by the pump body and the pump cover, and that the high-pressure connection bore extends from the damping region and is closed on its exit side with a ball or a plug. This realizes a relatively short longitudinal extension of the high-pressure connection bore and another simple and reliable sealing point.

In addition in a further development, the pressure-limiting valve bore can be connected to the inlet port chamber by a low-pressure connection bore located in the low-pressure region, whereby in this case the space available for the fluidic connection along which the pressure limiting takes place can also be used more optimally.

Insofar as it is further provided that the pressure-limiting valve bore and the low-pressure connection bore lie together in one plane and perpendicular to the longitudinal direction, this results in the advantage that machining, for example machining, of the pump housing to produce the pressure-limiting valve bore and the low-pressure connection bore is facilitated, since this machining can take place in the same plane and thus, for example, even with the same tool and/or, for example, simultaneously.

For this purpose, it is also possible in a further development that a filter bore is provided in the pump body, which connects the inlet port chamber with the damping chamber and in which a filter element is disposed, through which the fuel flowing from the inlet port chamber to the damping chamber flows, wherein the low-pressure connection bore and the filter bore intersect. This combination of features also has the advantage that the filter bore can fulfill a dual function, as already explained above.

In particular, it is intended that the outlet valve bore and the pressure-limiting valve bore are oriented at an angle different from 0°, in particular at right angles. This has the advantage that the available installation space can be better utilized.

In a further development of this, it can be provided that the pump housing comprises a pump body and a pump cover which are connected to one another, wherein the pump body and the pump cover delimits a damping region belonging to the low-pressure region, in which at least one diaphragm damper is disposed, the pressure-limiting valve bore being a blind bore extending from the damping region, from which a low-pressure connecting bore branches off, which lies in the low-pressure region and which opens into the inlet port chamber, and from which a high-pressure connecting bore branches off, which lies in the high-pressure region and which opens into the outlet port chamber, wherein the pressure-limiting valve bore is closed on its exit side with a ball or a plug. This results in the advantages already described for this measure.

In a further development, the low-pressure connection bore and the high-pressure connection bore can be oriented parallel to each other. This has the advantage that these bores can be drilled easily and efficiently, for example by machining the pump housing, for example using the same tool and/or at the same time.

Alternatively, it can be provided that the low-pressure connection bore and the high-pressure connection bore are oriented at an angle different from 0°, in particular at right angles to each other. The available installation space can then be used optimally.

In the context of the present disclosure, a bore (in particular outlet valve bore, pressure-limiting valve bore, low-pressure connection bore, high-pressure connection bore, etc.) is understood to mean in particular an internal contour of the pump housing or the pump body, which can be machined from the outside into the pump housing or the pump body by a rotating twist drill. In particular, the bore has an axial symmetry whose axis of symmetry corresponds to the axis of rotation of the twist drill. This axis of symmetry then indicates the direction in which the bore is oriented. In principle, the bore can be a through bore through the pump housing or pump body or a blind bore that ends at a bore bottom disposed in the pump housing or pump body. In the context of the present disclosure, the exit of a bore is the side of the bore that is first created by machining when the drill bit penetrates the pump housing or pump body. For blind bores, this is always the side opposite the bottom of the bore. The mouth of a bore is therefore the side of the bore opposite the exit of a bore if the bore meets another inner contour of the pump housing or pump body or emerges from the pump housing or pump body. The bores of the present disclosure are free of undercuts, particularly when viewed from their exit.

In the context of the present disclosure, the bore wall in a through-bore is the inner contour represented by the through-bore; in a blind-bore, the bore wall is the portion of the inner contour represented by the through-bore that is not the bottom of the bore.

In the context of the present disclosure, the high-pressure region is understood to be the entire space that communicates with the outlet without further action, in particular without further intermediate valves, so that a uniform pressure is established in the high-pressure region, for example 500 bar when the pump is in operation.

In the context of the present disclosure, the low-pressure region is understood to be the entire space that communicates with the inlet without further, in particular without further intermediate valves, so that a uniform pressure is established in the low-pressure region, for example 5 bar during operation of the pump and with a low-pressure pump connected to the inlet.

In particular, the internal contours of the high-pressure fuel pump through which the fuel flows consist of the low-pressure region, the delivery chamber and the high-pressure region. These regions are separated from each other by the inlet valve, the outlet valve and the pressure-limiting valve.

The fuel can be a fuel such as gasoline, for example.

Where an angle other than 0° is referred to in the context of the invention, this can be an angle that is significantly different from 0°, for example at least 2° or at least 5°. For example, it can be an angle between 2° and 90°.

DETAILED DESCRIPTION

Figure 1:
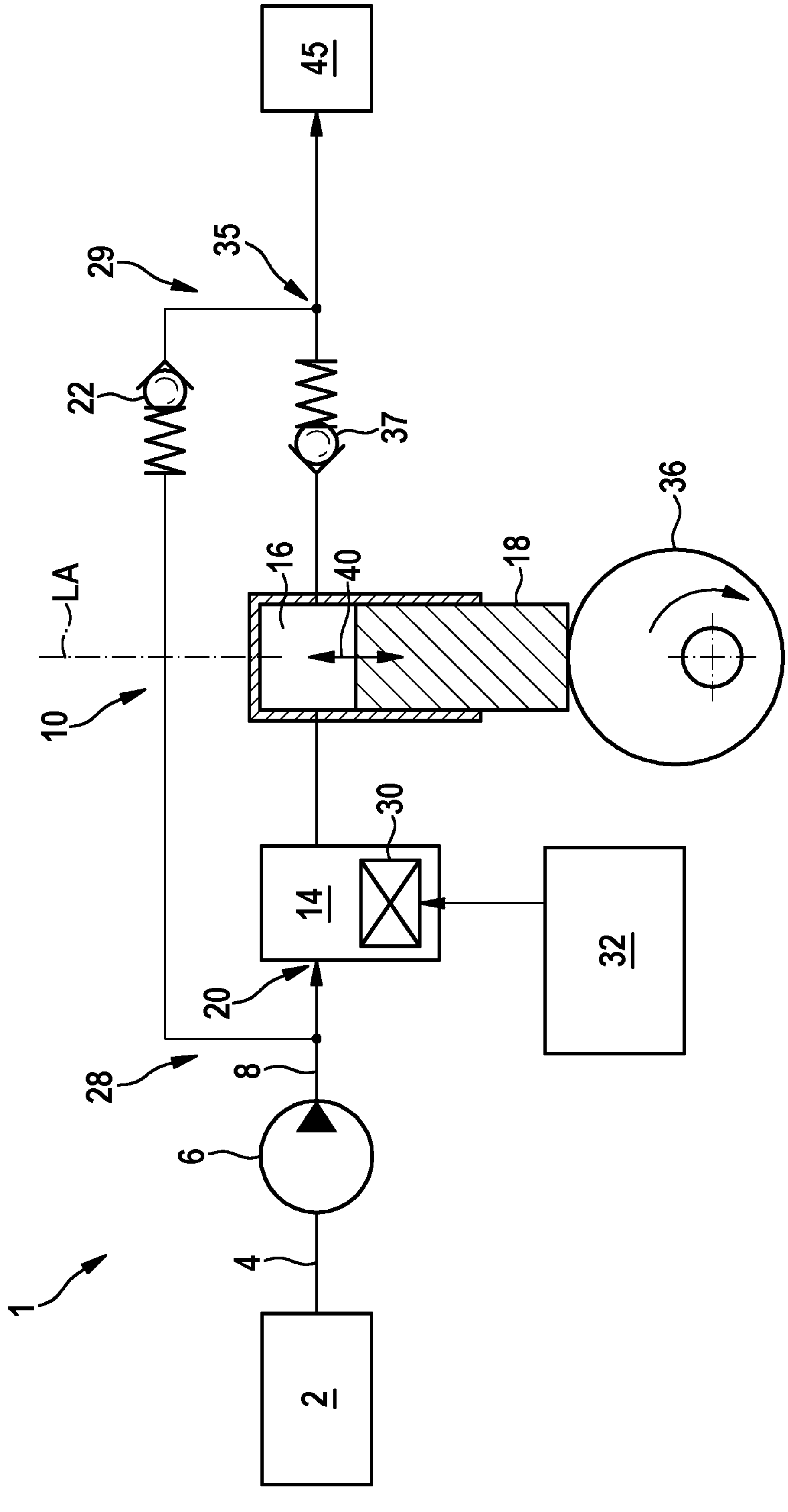
FIG. 1 shows a simplified schematic diagram of a fuel system for an internal combustion engine.

FIG. 1 shows a fuel system 1 for an internal combustion engine not shown in a simplified schematic diagram. During operation of the fuel system 1, fuel is fed from a fuel tank 2 via a suction line 4 by means of a pre-feed pump 6 and a low-pressure line 8 via an inlet port 20 to a high-pressure fuel pump 10 designed as a piston pump. An inlet valve 14 is fluidically disposed downstream of the inlet port 20. A low-pressure region 28 of the high-pressure fuel pump 10 is located fluidically between the inlet port 20 and the inlet valve 14. A delivery chamber 16 of the high-pressure fuel pump 10 is located downstream of the inlet valve 14. Pressure pulsations in the low-pressure region 28 can be damped by means of a pressure damping device. The inlet valve 14 can be forcibly opened via an actuating device designed here as an electromagnetic actuator 30. The actuating device and thus the inlet valve 14 can be controlled via a control unit 32.

A pump piston 18 of the high-pressure fuel pump 10 can be moved up and down along a longitudinal axis running in the longitudinal direction LA, to which the pump piston 18 is axially symmetrical, by means of a drive 36 designed in the present case as a cam disk, which is shown in FIG. 1 by a double arrow 40. An outlet valve 37 is disposed fluidically between the delivery chamber 16 and an outlet port 35 of the high-pressure fuel pump 10, which can open towards the outlet port 35 and a high-pressure accumulator 45 ("rail") located further downstream. As a result, a high-pressure region 29 of the high-pressure fuel pump 10 extends fluidically between the outlet valve 37 and the outlet port 35.

The high-pressure region 29 and the low-pressure region 28 are directly connected to each other via a pressure-limiting valve 22, which opens when a limit pressure is exceeded in the high-pressure region 29 of the high-pressure fuel pump 10 or in the high-pressure accumulator 45 communicating with it. The pressure-limiting valve 22 is designed as a spring-loaded check valve and can open towards the low-pressure region 28 of the high-pressure fuel pump 10. In this way, the pressure that can be generated by the high-pressure fuel pump 10 in the high-pressure accumulator 45 is limited.

As a first embodiment example, FIG. 2 shows a high-pressure fuel pump 10 in part a) in a sectional view along the plane which appears as line a-a in part b), and in part b) in a sectional view along the plane which appears as line b-b in part a).

The high-pressure fuel pump 10 has an inlet 11 in the form of an inlet port 20. Without intermediate valves, the inlet 11 communicates with the entire low-pressure region 28 of the high-pressure fuel pump 10.

The high-pressure fuel pump 10 has an outlet 34 in the form of an outlet port 35. Without intermediate valves, the outlet 34 communicates with the entire high-pressure region 29 of the high-pressure fuel pump 10.

The outlet port 35 and the inlet port 20 are fixed to a pump housing 12, in which a delivery chamber 16 is also disposed, which is delimited by a pump piston 18 that can be displaced along a longitudinal direction LA.

The low-pressure region 28 comprises a damper chamber 28*a*, which is connected to the inlet 11 via a fluidic connection not visible in this cross-section and which is formed between a pump body 12*a* of the pump housing 12 and a pump cover 12*b* of the pump housing 12. A diaphragm damper 55 is disposed in the damping chamber 28*a*, which can have the shape of a flat and compressible can formed by two metal diaphragms.

The fluidic connection between the inlet 11 and the damper chamber 28*a* can, for example, comprise a filter bore in which a filter element is disposed which frees a fuel flowing through the filter bore from entrained solid particles above a minimum size.

Figure 2A:
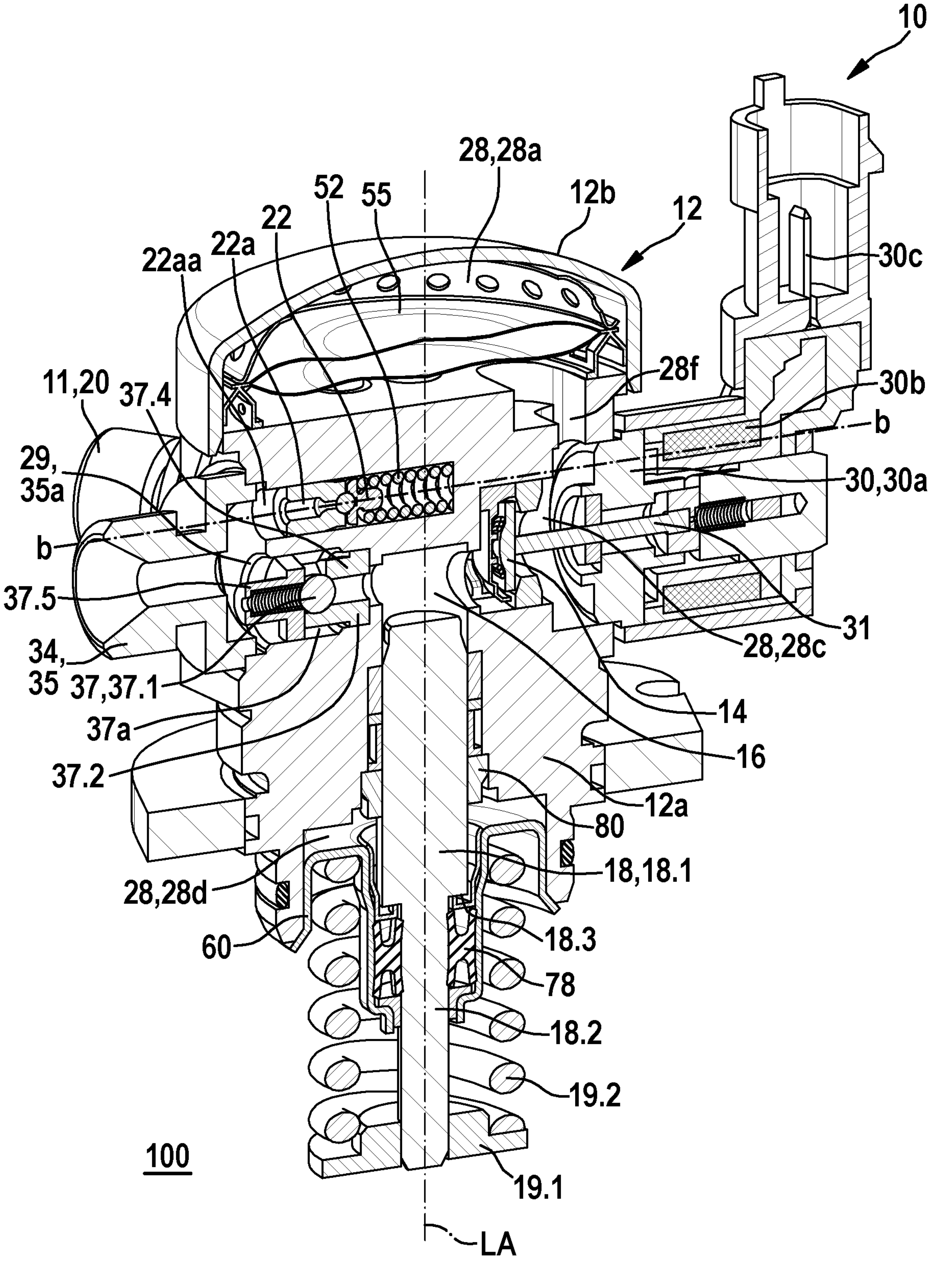
FIG. 2 shows a first embodiment example of the disclosure.
Figure 2B:
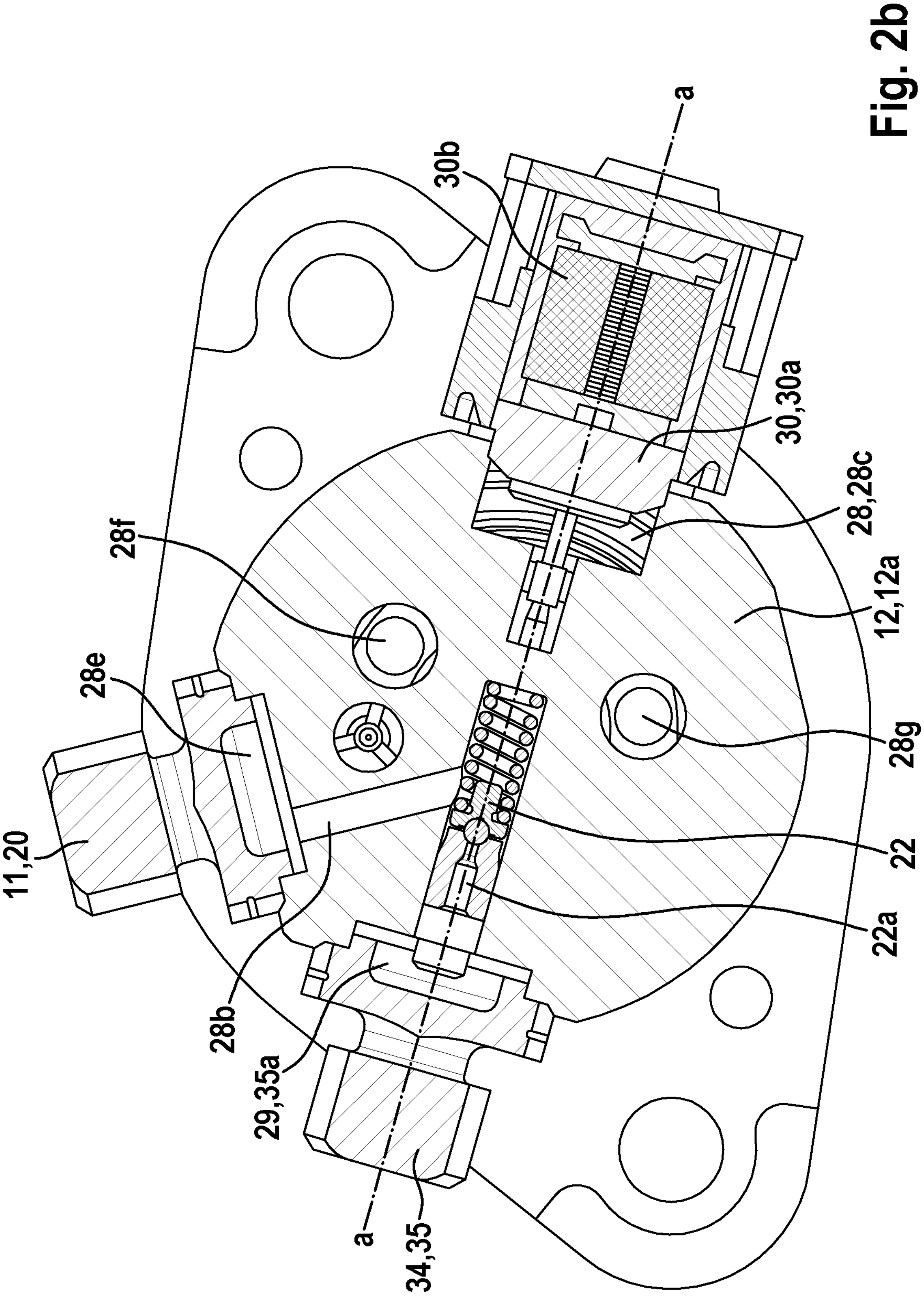

A seal carrier 60 is attached to the lower portion of the pump body 12*a* in FIG. 2*a* and a stepped chamber 28*d* is formed between the pump body 12*a* and the seal carrier 60. The stepped chamber 28*d* communicates with the damping chamber 28*a* via a stepped chamber bore 28*g*, visible in FIG. 2*b*, through the pump body 12*a* and is therefore part of the low-pressure region 28.

The delivery chamber 16 is limited towards the low-pressure region 28 by an inlet valve 14, which opens towards the delivery chamber 16 when there is a corresponding pressure difference.

In order to control the delivery rate of the high-pressure fuel pump 10, the inlet valve 14 can be forcibly opened by a tappet 31 driven by the actuator 30. For this purpose, the actuator 30 has an actuator housing 30*a* fixed to the pump housing 12, in which an electromagnetic coil 30*b* is disposed, which can be energized via an externally accessible electrical connection 30*c* of the high-pressure fuel pump 10.

Geometrically between the inlet valve 14 and the actuator 30, an inlet valve region 28*c* of the low-pressure region 28 is formed in the pump housing 12. It communicates with the damping region 28*a* via the bore 28*f*.

The delivery chamber 16 is limited towards the high-pressure region 29 by an outlet valve 37, which opens away from the delivery chamber 16 when there is a corresponding pressure difference. In this example, it is disposed in an outlet valve bore 37*a* of the pump housing 12 or the pump body 12*a*. It has a movable valve element 37.1, which interacts with a sealing seat 37.4, which is formed on a sealing seat part 37.2 disposed upstream of the valve element 37.1 and fixed to the pump. The movement of the valve element 37.1 in the downstream direction is limited by a counter plate 37.5 that is fixed to the pump. The outlet valve bore 37*a* extends from an outlet port chamber 35*a* located between the outlet port 35 and the pump housing 12 or the pump body 12*a*.

The pump piston 18 is designed as a stepped piston. It has a first portion 18.1 pointing towards the delivery chamber 16 with a larger diameter and a second portion 18.2 pointing away from the delivery chamber with a smaller diameter (relative to the diameter of the first portion 18.1). Between the first and second portions 18.1, 18.2, an annular step 18.3 is formed, pointing vertically downwards in FIG. 2*a*.

A high-pressure seal 80 is disposed between the first portion 18.1 and the pump housing 12, in which the pump piston 18 can be displaced. The high-pressure seal 80 separates the delivery chamber 16 from the low-pressure region 28.

The high-pressure seal 80 can, for example, be a separate sealing ring, e.g. made of metal or plastic, for example as explained in more detail in WO 19 015 862 A1 of the applicant. On the other hand, the high-pressure seal 80 can also be a narrow gap extending over a certain length between the pump piston 18 and a bushing or between the pump piston 18 and the pump housing 12, for example as explained in more detail in WO 06 069 819 A1 of the applicant.

A low-pressure seal 78 is disposed between the second portion 18.2 and the seal carrier 60 already mentioned above, which separates the stepped chamber 28*d* of the low-pressure region 28 from the space 100, which is located outside the high-pressure fuel pump 10. The pump piston 18 can be displaced in the low-pressure seal 78.

The pump piston 18 is pretensioned in the longitudinal direction LA, which is pointing downwards in FIG. 2*a*, by means of a spring plate 19.1 fixed to the pump piston 18 and a pump spring 19.2 clamped between the spring plate 19.1 and the seal carrier 60.

The high-pressure fuel pump 10 according to the disclosure has a pressure-limiting valve 22 which fluidically connects the high-pressure region 29 to the low-pressure region 28 and opens towards the low-pressure region 28, so that fuel flows out of the high-pressure region 29 into the low-pressure region 28 when the pressure difference between fuel in the high-pressure region 29 and fuel in the low-pressure region 28 exceeds an opening pressure. The arrangement of the pressure-limiting valve 22 in the high-pressure fuel pump 10 according to the disclosure will now be discussed further by way of example.

It is provided, for example, that the pressure-limiting valve 22 is disposed in a pressure-limiting valve bore 22*a* of the pump housing 12 and that the inlet 11 is designed as an inlet port 20 fixed to the pump housing 12 and an inlet port chamber 28*e* of the low-pressure region 28 is formed between the pump housing 12 and the inlet port 20, wherein the pressure-limiting valve 22 fluidically connects the high-pressure region 29 to the inlet port chamber 28*e* of the low-pressure region 28 and opens towards the inlet port chamber 28*e*, so that fuel flows out of the high-pressure region 29 into the inlet port chamber 28*e* when the pressure difference between fuel in the high-pressure region 29 and fuel in the low-pressure region 28 exceeds an opening pressure.

For example, the pressure-limiting valve bore 22*a* is connected to the inlet port chamber 28*e* by a low-pressure connection bore 28*b* located in the low-pressure region 28.

In the first embodiment example according to FIG. 2, the outlet valve bore 37*a* and the pressure-limiting valve bore 22*a* are oriented geometrically parallel to each other.

In the representation according to FIG. 2*a*, the outlet valve bore 37*a* and the pressure-limiting valve bore 22*a* are disposed in the plane of the drawing, namely the outlet valve bore 37*a* is disposed on the side of the pressure-limiting valve bore 22*a* facing away from the damping region 28*a*.

In addition to the outlet valve bore 37*a*, it is further exemplarily provided that the pressure-limiting valve bore 22*a* also extends from the outlet port chamber 35*a* and that the pressure-limiting valve bore 22*a* is connected to the inlet port chamber 28*e* by a low-pressure connecting bore 28*b* located in the low-pressure region 28 and oriented perpendicular to the longitudinal direction LA. The low-pressure connection bore 28*b* can, for example, be perpendicular to a longitudinal axis of the high-pressure fuel pump 10 and/or perpendicular to an axis of symmetry of the pump piston 18 and/or the diaphragm damper 55.

In particular, the outlet port 35 extends transversely to the flow direction across the exit of the pressure-limiting valve bore 22*a* and across the exit of the outlet valve bore 37*a*, so that the pressure-limiting valve bore 22*a* and the outlet valve bore 37*a* communicate with each other via the outlet port chamber 35*a* disposed between the pump housing 12 and the outlet port 35.

An (external) diameter with which the outlet port 35 is fixed to the pump housing in this arrangement is relatively large, for example at least as large as the sum of the diameter of the pressure-limiting valve bore 22*a* and the diameter of the outlet valve bore 37*a*, in particular even at least as large as 1.2 times this sum.

The cross-section of the pressure-limiting valve bore 22*a* can be smaller than the cross-section of the outlet valve bore 37*a*.

The cross-section of the low-pressure connection bore 28*b* can be smaller than the cross-section of the pressure-limiting valve bore 22*a*, for example by 5% to 35%.

The pressure-limiting valve bore 22*a* can be a blind bore into which the low-pressure connection bore 28*b* opens, preferably into the bore wall at a location spaced from the bottom of the pressure-limiting valve bore 22*a*.

It can be provided that an axis of the pressure-limiting valve bore 22*a* intersects, in particular intersects at right angles, an axis of the low-pressure connection bore 28*b* at a point of intersection which is spaced from the bore bottom of the pressure-limiting valve bore 22*a* by at least a dimension which is given by 0.6 times the diameter of the low-pressure connection bore 28*b*, in particular by 1.5 times the diameter of the low-pressure connection bore 28*b*. A spiral spring 52 of the pressure-limiting valve 22 can then rest against the bottom of the pressure-limiting valve bore 22*a* without overlapping with the mouth of the low-pressure connection bore 28*b*.

The pressure-limiting valve bore 22*a* and the low-pressure connection bore 28*b* can lie together in one plane and perpendicular to the longitudinal direction LA, for example in the drawing plane of part a) of FIG. 2.

Figure 3:
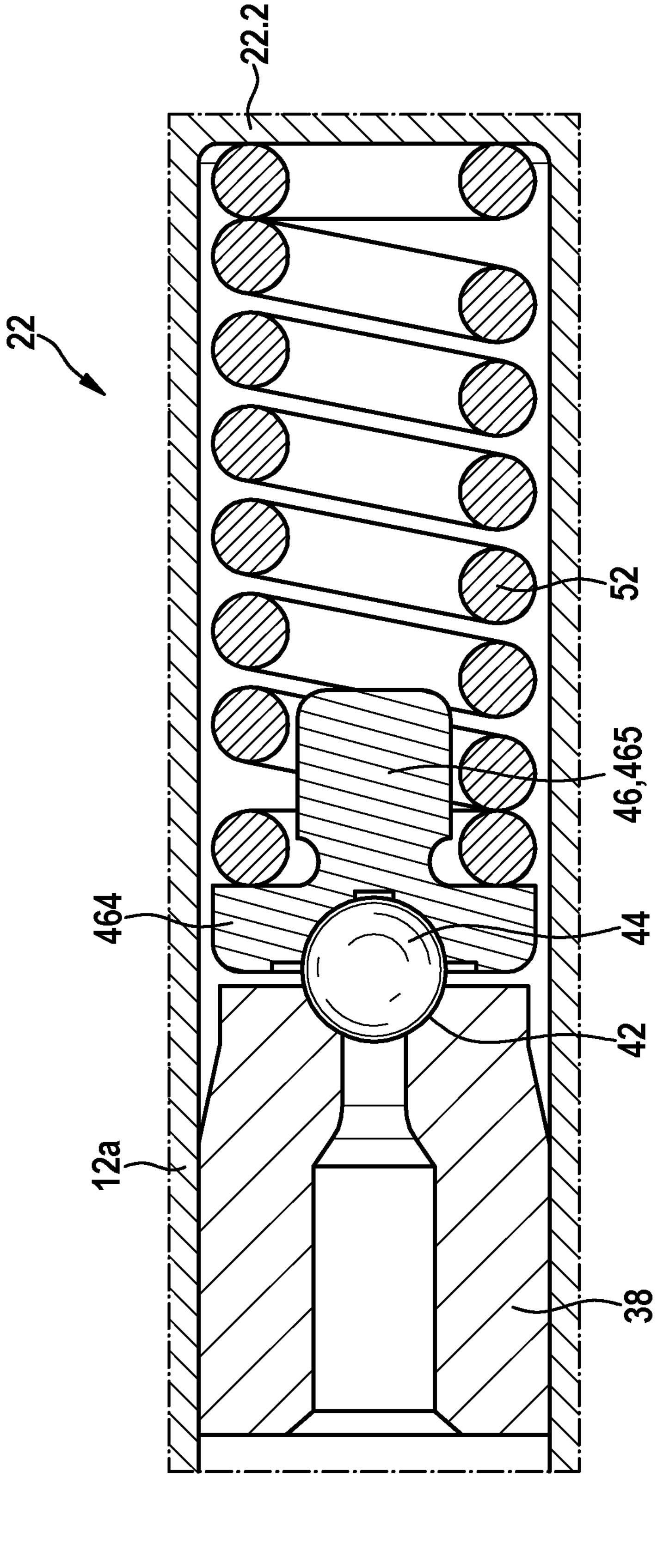
FIG. 3 shows a detailed example of a pressure-limiting valve as it can be used in the embodiments shown.

The pressure-limiting valve 22 shown in FIG. 2 (it can also be the pressure-limiting valve 22 shown in FIGS. 4 through 8) is shown enlarged and as an example in FIG. 3. It has a valve seat body 38 pressed into the pressure-limiting valve bore 22*a* or into a housing of the pressure-limiting valve 22, on which a tapered valve seat 42 is formed. The pressure-limiting valve 22 also has a valve element 44, which has the shape of a ball and which comes into sealing contact with the valve seat 42. The valve element 44 is pressed in the closing direction by a holding element 46 and the holding element 46 is pressed in the closing direction by a spiral spring 52. The spiral spring 52 is supported on a housing of the pressure-limiting valve 22 or directly on the pump housing 12. The spiral spring 52 is in contact with a radially outer region 464 of the holding element 46. A radially inner region 465 of the holding element 46 is accommodated by the spiral spring 52. The opening pressure of the pressure-limiting valve 22 is defined by the stiffness of the spiral spring 52 and by the effective area at the pressure-limiting valve 22, and thus also the maximum pressure difference that the high-pressure fuel pump 10 is able to generate between its inlet 11 and its outlet 34.

Figure 4:
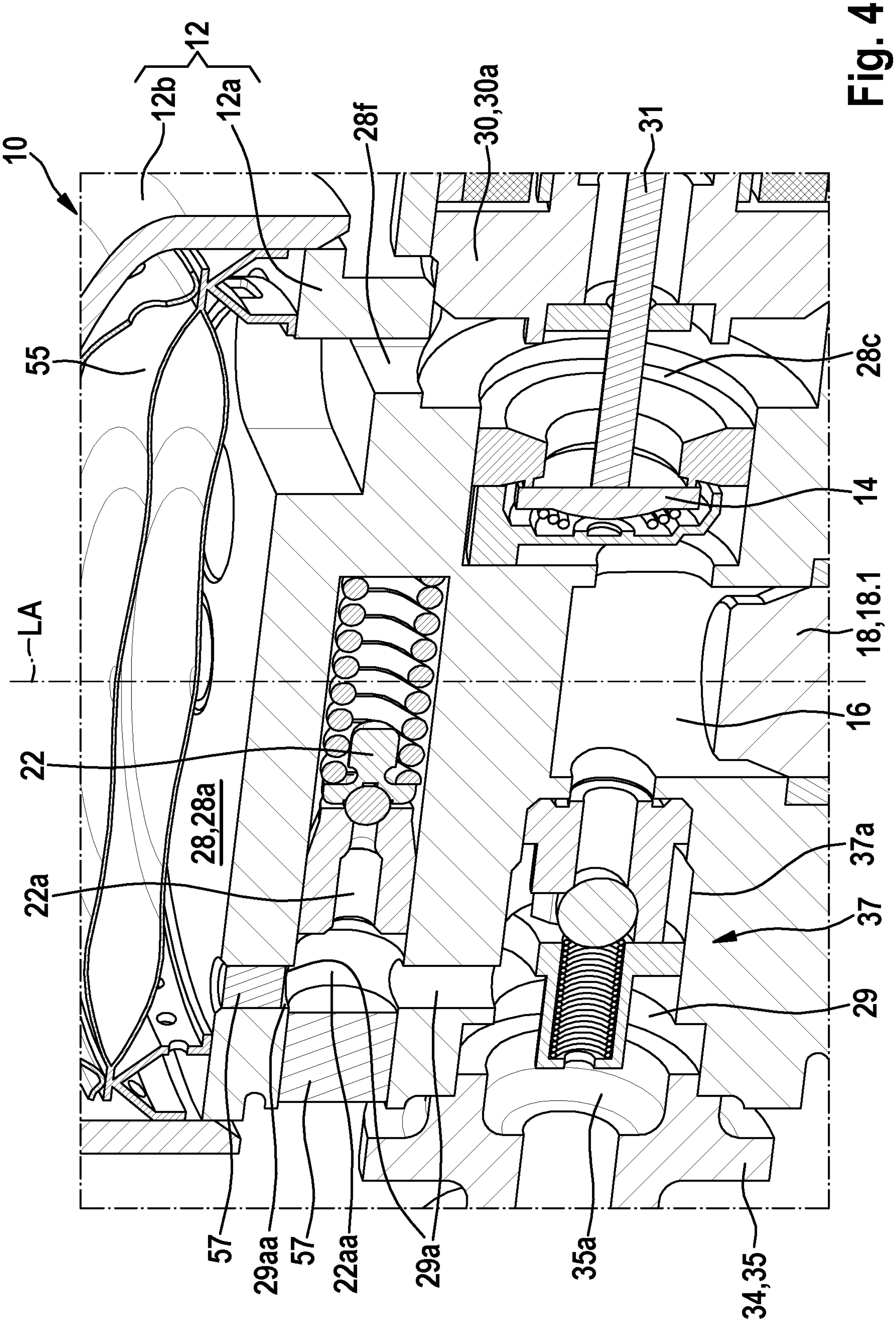
FIG. 4 shows a second embodiment example of the disclosure.

FIG. 4 shows a sectional view of a second embodiment example. It differs from the first embodiment example in that only the outlet valve bore 37*a*, but not the pressure-limiting valve bore 22*a*, extends from the outlet port chamber 35*a*. Instead, it is provided in this embodiment example that the pressure-limiting valve bore 22*a* is closed on the side of its exit 22*aa* with a ball 56 pressed in particular into the pressure-limiting valve bore 22*a* or a plug 57 pressed in particular into the pressure-limiting valve bore 22*a*, wherein the outlet valve bore 37*a* is connected to the pressure-limiting valve bore 22*a* by a high-pressure connecting bore 29*a* located in the high-pressure region 29.

It can be provided that the high-pressure connecting bore 29*a* extends from the damping region 28*a* and is closed on its exit side 29*aa* by a ball 56 or a plug 58 pressed into it.

The outlet port can be made smaller than in the first embodiment example, for example an (outer) diameter with which the outlet port 35 is fixed to the pump housing 12 in this arrangement can be smaller than the sum of the diameter of the pressure-limiting valve bore 22*a* and the diameter of the outlet valve bore 37*a*, in particular even smaller than 0.9 times this sum. The robustness of the connection of the outlet port 35 to the pump housing 12 is increased in this way, because while the hydraulic forces acting on the outlet port 35 are proportional to the cross-sectional area covered by it, the connection length with which the outlet port 35 is fixed to the pump housing 12 is only proportional to the circumference of the cross-sectional area covered by it, i.e. proportional to the square root of the cross-sectional area covered by it.

What was said in the first embodiment example with regard to the pressure-limiting valve bore 22*a*, the outlet valve bore 37*a* and the low pressure connection bore 28*b* and to the relations between these bores is also valid in this second embodiment example.

The high-pressure connecting bore 29*a* can have a cross-section that is smaller than the respective cross-sections of the pressure-limiting valve bore 22*a*, the outlet valve bore 37*a* and the low-pressure connecting bore 28*b*, for example at most half as large in each case.

An axis of the high-pressure connection bore 29*a* and an axis of the pressure-limiting valve bore 22*a* can intersect, in particular intersect at right angles, wherein an intersection point of these axes is preferably at least half a diameter, in particular a whole diameter, of the pressure-limiting valve bore 22*a* away from the exit of the pressure-limiting valve bore 22*a* and/or wherein an intersection point of these axes is preferably at least half a diameter, in particular a whole diameter, of the high-pressure connection bore 29*b* away from the exit of the high-pressure connection bore 29*b*. In this way, the pressure-limiting valve bore 22*a* and/or the high pressure connection bore 29*b* can be closed particularly easily on its exit side 29*aa* with a ball 56 pressed into it or a plug 58 pressed into it.

Figure 5A:
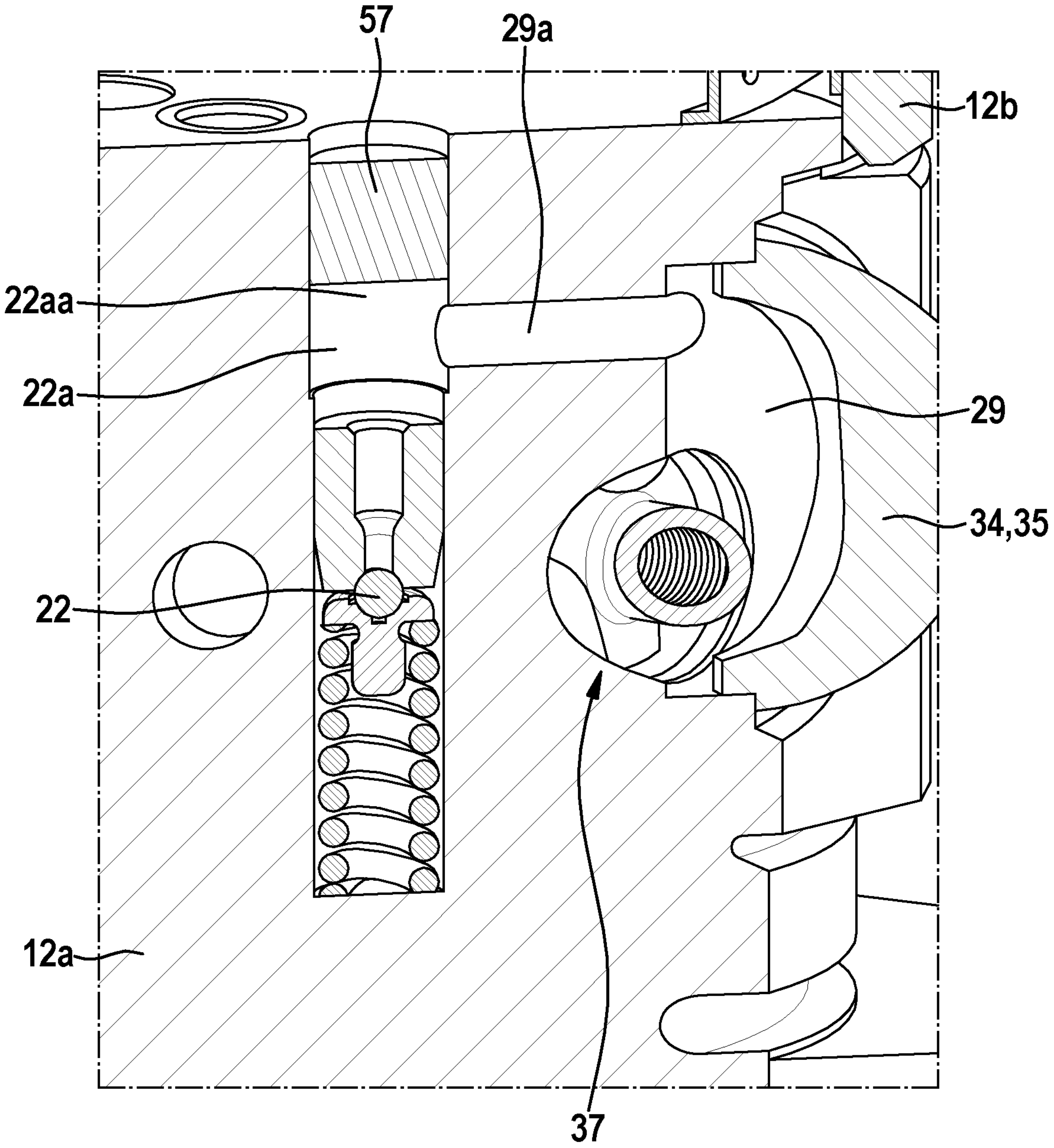
FIG. 5 shows a third embodiment example of the disclosure.
Figure 5B:
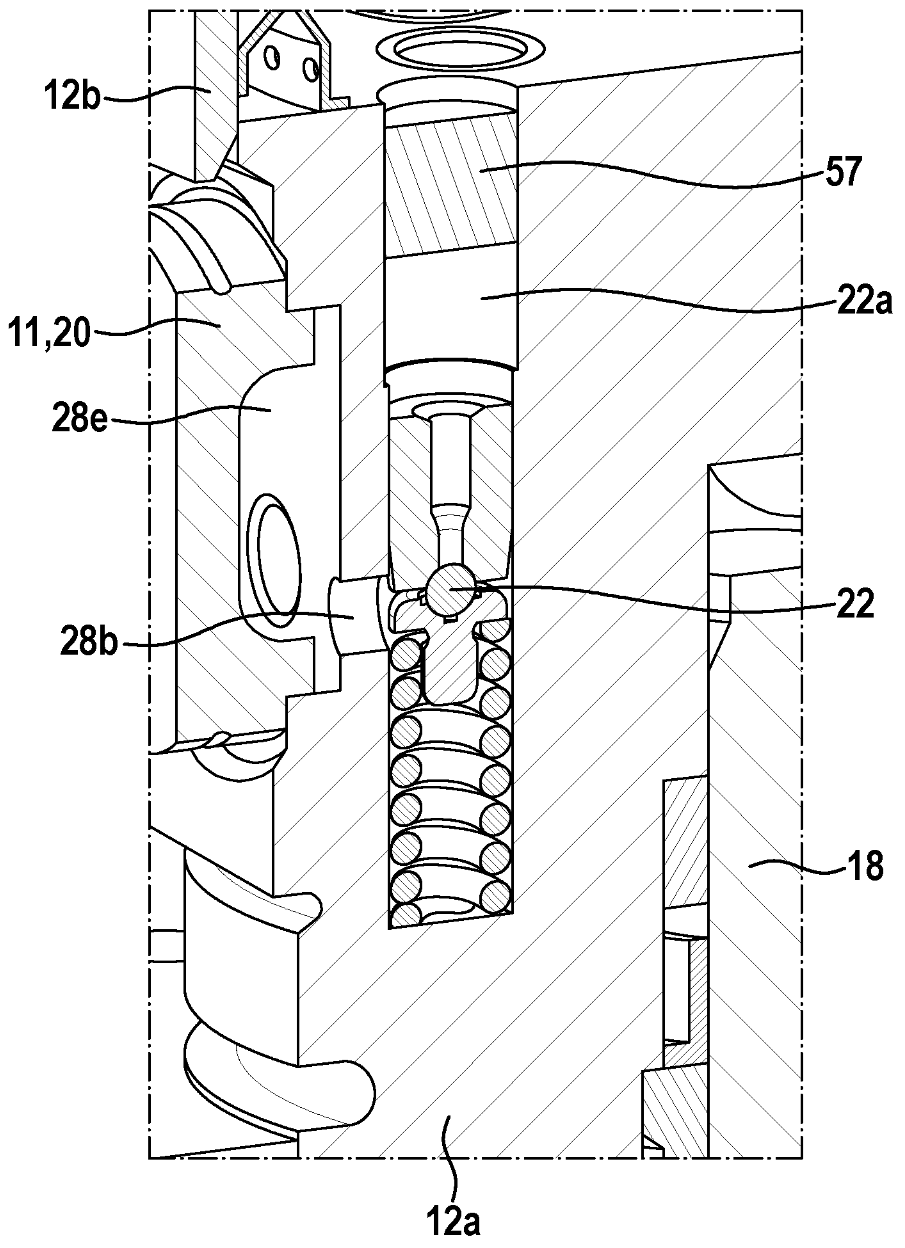
Figure 5C:
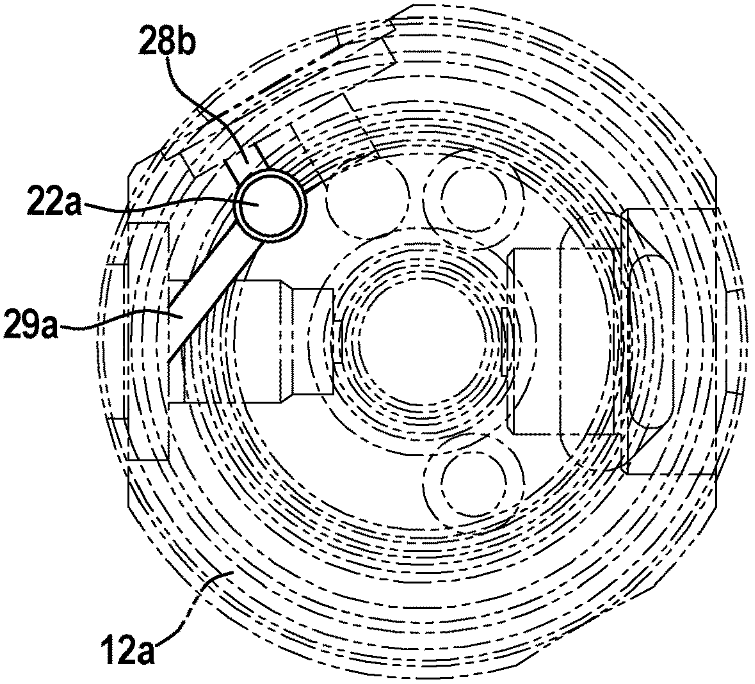

FIG. 5 shows a third embodiment example in part a) by means of a first sectional view along the axis of the pressure-limiting valve bore 22*a*, which is parallel to the longitudinal direction LA; in part b) by means of a second sectional view along the axis of the pressure-limiting valve bore 22*a*, rotated about the axis of the pressure-limiting valve bore 22*a* in comparison to part a); and in part c) by means of a top view of the pump body 12*a*, which is shown partially transparent.

According to the third embodiment example, the outlet valve bore 37*a* and the pressure-limiting valve bore 22*a* are oriented at an angle different from 0° to one another, in particular at right angles.

It is further provided that the outlet 34 is formed as an outlet port 35 fixed to the pump housing 12, and an outlet port chamber 35*a* is formed between the pump housing 12 and the outlet port 35, wherein the pump housing 12 comprises a pump body 12*a* and a pump cover 12*b* which are connected to one another, the pump body 12*a* and the pump cover 12*b* delimiting a damping region 28*a* which belongs to the low-pressure region 28 and in which at least one diaphragm damper 55 is disposed, wherein the pressure-limiting valve bore 22*a* is a blind bore extending from the damping region 28*a*, from which a low-pressure connecting bore 28*b* branches off, which lies in the low-pressure region 28 and which opens into the inlet port chamber 28*e*, and from which a high-pressure connecting bore 29*a* branches off, which lies in the high-pressure region 29 and which opens into the outlet port chamber 35*a*, wherein the pressure-limiting valve bore 22*a* is closed on its exit side 22*aa* with a ball 56 or a plug 57.

It can be provided that the low-pressure connecting bore 28*b* and the high-pressure connecting bore 29*a* are oriented at an angle different from 0°, for example at least 20° or at right angles to each other, see part c) of FIG. 5. Alternatively, the low-pressure connecting bore 28*b* and the high-pressure connecting bore 29*a* can be oriented geometrically parallel to each other (not shown).

Figure 6A:
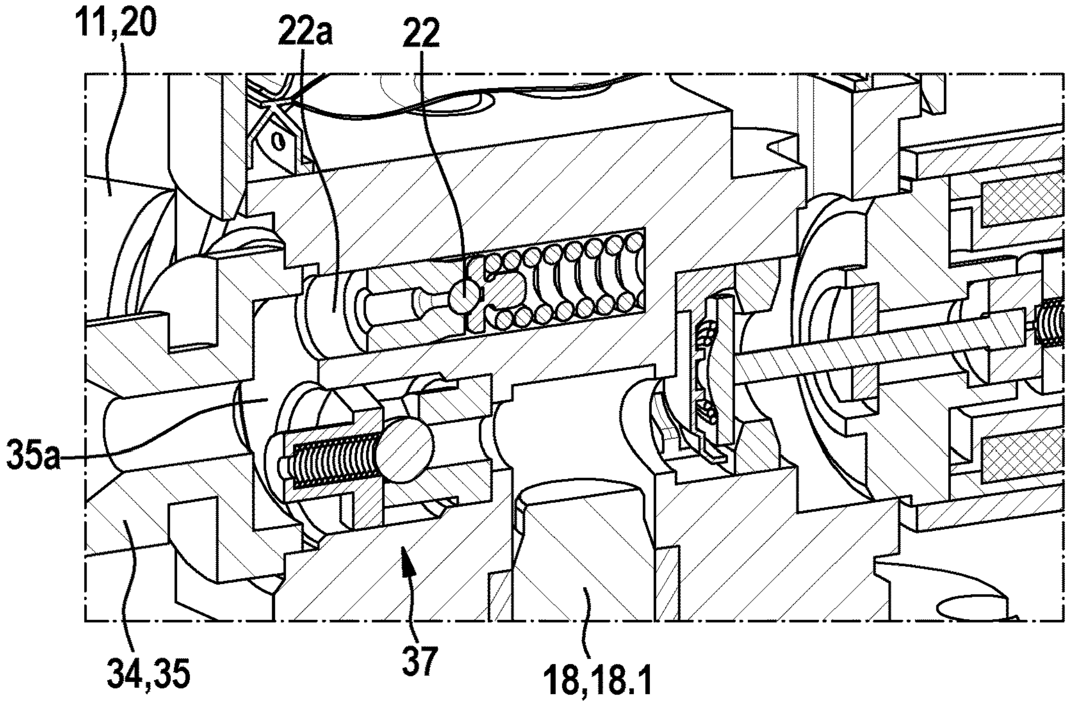
FIG. 6 shows a fourth embodiment example of the invention disclosure.
Figure 6B:
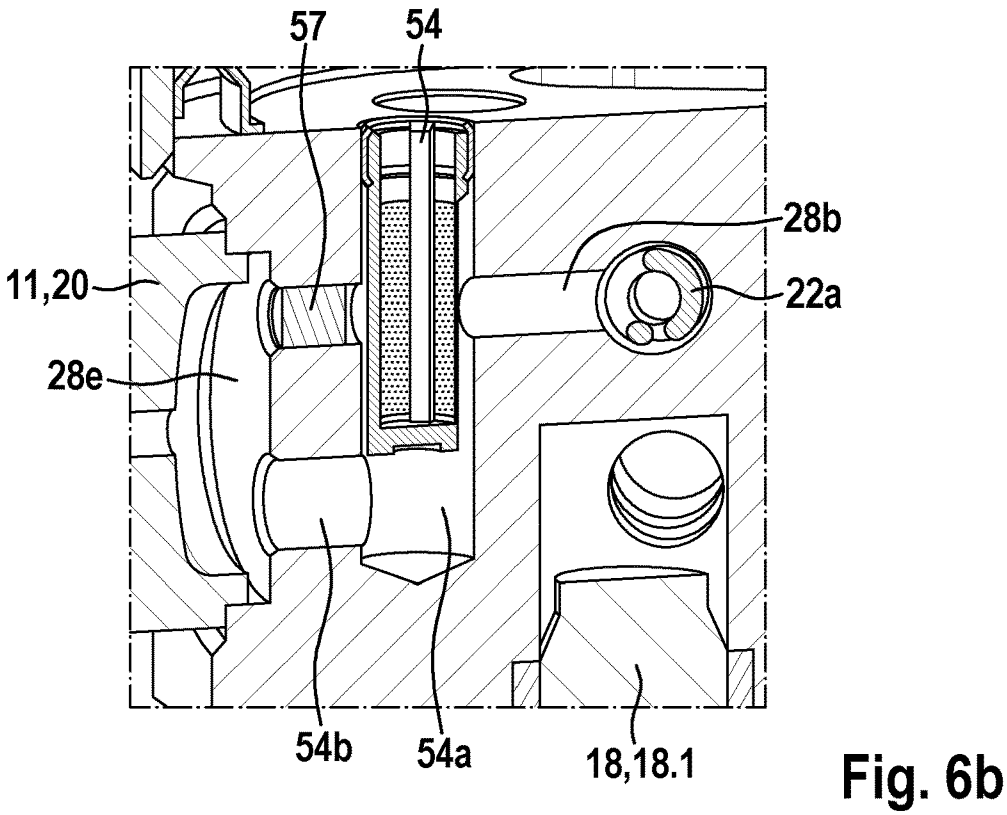
Figure 6C:
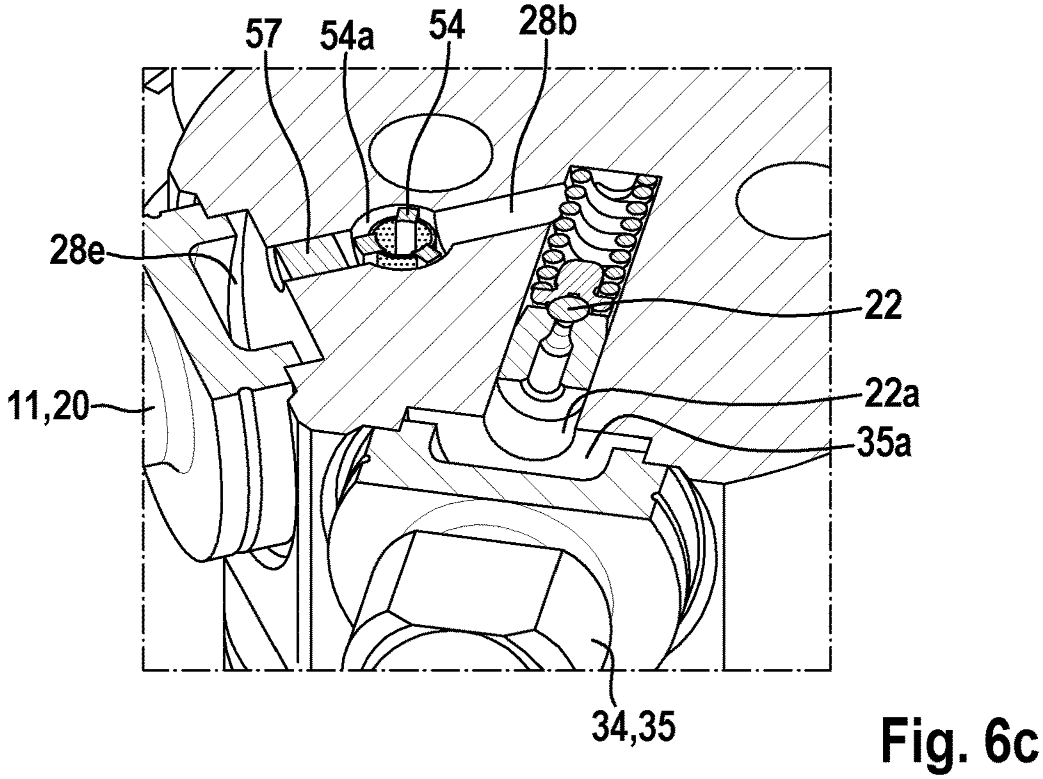

A fourth embodiment example is shown in FIG. 6 in part a) in a first sectional view which is parallel to the longitudinal axis, in part b) in a second sectional view which is rotated about the longitudinal axis compared to the first sectional view, and in part c) in a sectional view which is perpendicular to the longitudinal direction LA.

It is provided that a filter bore 54*a* is provided in the pump body 12*a*, which connects the inlet port chamber 28*e* to the damping chamber 28*a* and in which a filter element 54 is disposed, which filters the fuel flowing from the inlet port chamber 28*e* to the damping chamber 28*a*, wherein the low-pressure connecting bore 28*b* and the filter bore 54*a* intersect.

Either, as shown in parts b) and c) of FIG. 6, the filter bore 54*a* on the side of the inlet port chamber 28*e* is closed by a plug 57 or by a ball 56. In this case, fluidic communication between the filter bore 54*a* and the inlet port chamber 28*e* takes place via an additional bore 54*b*, the mouth of which is located near the bottom of the filter bore 54*a*.

Figure 8:
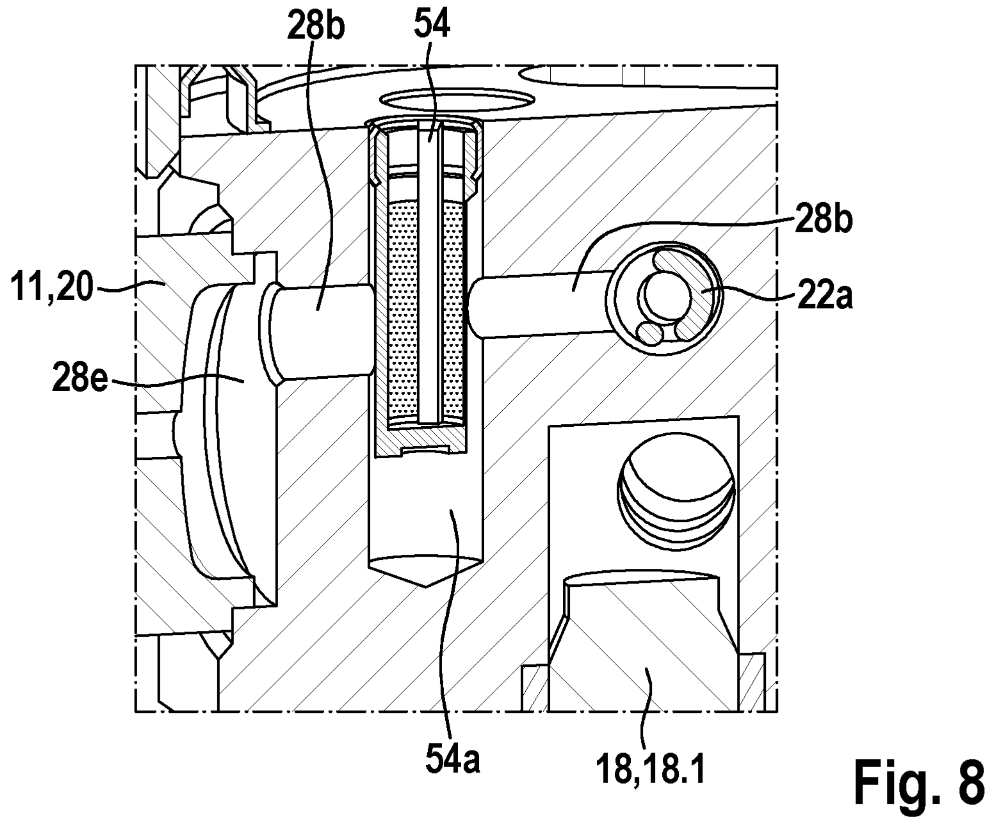
FIG. 8 shows a sixth embodiment example of the invention disclosure.

Alternatively, the filter bore 54*a* can be formed unsealed between the inlet port chamber 28*e* and the pressure-limiting valve bore 22*a*, see sixth embodiment example for which the view corresponding to part b) of FIG. 6 is shown in FIG. 8. The additional bore 54*b* proposed in connection with the fourth embodiment example is, as can be seen, readily dispensable in the sixth embodiment example.

Figure 7A:
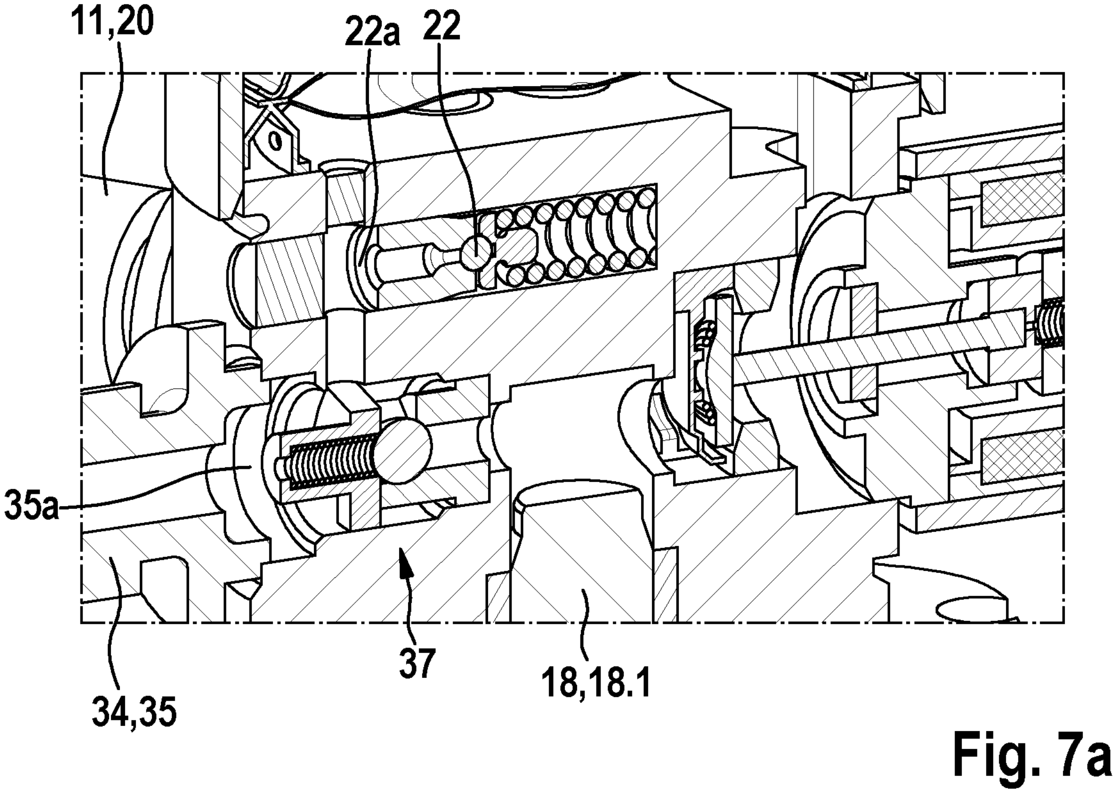
FIG. 7 shows a fifth embodiment example of the invention disclosure.
Figure 7B:
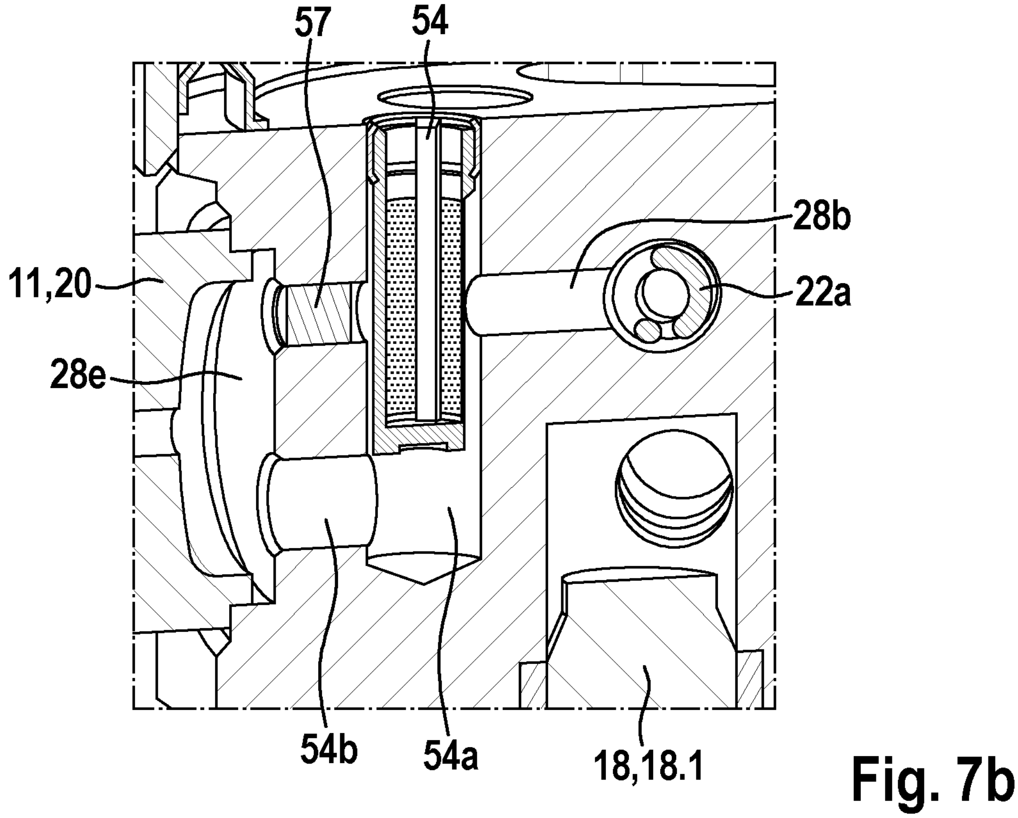
Figure 7C:
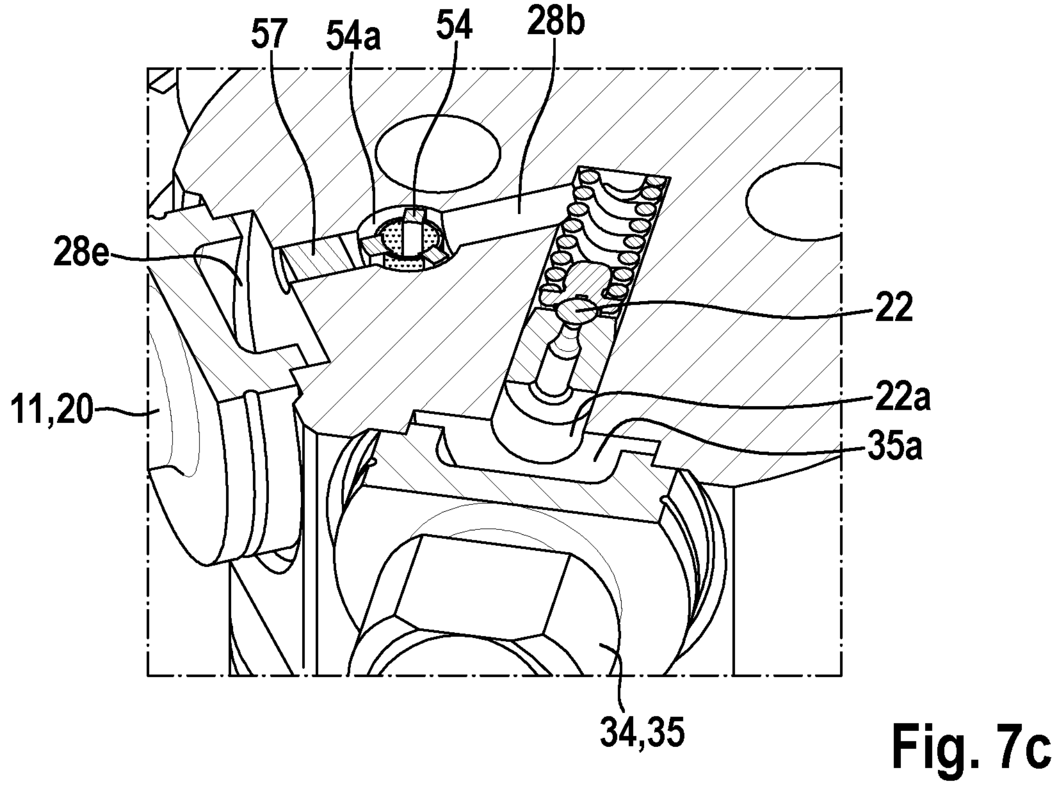

A fifth embodiment example is shown in FIG. 7 in part a) in a first sectional cutaway view which is parallel to its longitudinal axis, in part b) in a second sectional cutaway view which is rotated about the longitudinal axis compared to the first sectional view, and in part c) in a sectional cutaway view which is perpendicular to the longitudinal direction LA.

This is a modification of the second embodiment example explained with reference to FIG. 4, in that, similarly to the fourth embodiment example, it is provided that a filter bore 54*a* is provided which connects the inlet port chamber 28*e* to the damping chamber 28*a* and in which a filter element 54 is disposed which filters the fuel flowing from the inlet port chamber 54*a* to the damping chamber 28*a*, wherein the low-pressure connecting bore 28*b* and the filter bore 54*a* intersect.

The invention claimed is:

1. A high-pressure fuel pump for a fuel system for an internal combustion engine, the high-pressure fuel pump comprising:

an inlet for supplying fuel;

an outlet for discharging compressed fuel;

a pump housing;

delivery chamber disposed in the pump housing;

a pump piston, which is displaceable in the pump housing along a longitudinal direction and which delimits the delivery chamber;

an inlet valve, which is disposed between the inlet and the delivery chamber and which opens towards the delivery chamber;

an outlet valve, which is disposed between the delivery chamber and the outlet, the outlet valve opening away from the delivery chamber;

a high-pressure region, which extends fluidically between the outlet valve and the outlet;

a low-pressure region, which extends fluidically between the inlet and the inlet valve; and a pressure-limiting valve configured such that, when a pressure difference between fuel in the high-pressure region and fuel in the low-pressure region exceeds an opening pressure, the pressure-limiting valve fluidically connects the high-pressure region to the low-pressure region and opens towards the low-pressure region to enable fuel to flow out of the high-pressure region into the low-pressure region, wherein the outlet valve is disposed in an outlet valve bore of the pump housing and the pressure-limiting valve is disposed in a pressure-limiting valve bore of the pump housing, wherein the inlet is formed as an inlet port fixed to the pump housing and an inlet port chamber of the low-pressure region is formed between the pump housing and the inlet port, wherein the pressure-limiting valve fluidically connects the high-pressure region to the inlet port chamber of the low-pressure region and opens towards the inlet port chamber, such that fuel flows out of the high-pressure region into the inlet port chamber when the pressure difference between fuel in the high-pressure region and fuel in the low-pressure region exceeds the opening pressure, wherein the pressure-limiting valve bore and the outlet valve bore are oriented geometrically parallel to each other, and wherein a low-pressure connection bore extends from the inlet port chamber of the low-pressure region to the pressure-limiting valve bore unidirectionally in a direction parallel with the inlet port.

2. The high-pressure fuel pump according to claim 1, wherein:

the outlet is formed as an outlet port fixed to the pump housing, and an outlet port chamber is formed between the pump housing and the outlet port, and the outlet valve bore and the pressure-limiting valve bore both extend from the outlet port chamber.

3. The high-pressure fuel pump according to claim 1, wherein the pressure-limiting valve bore is connected to the inlet port chamber through the low-pressure connection bore.

4. The high-pressure fuel pump according to claim 3, wherein the pressure-limiting valve bore and the low-pressure connection bore lie together in one plane and are perpendicular to the longitudinal direction.

5. The high-pressure fuel pump according to claim 3, wherein:

the pump housing comprises a pump body and a pump cover, which are connected to one another, a damping region belonging to the low-pressure region is delimited by the pump body and the pump cover, at least one diaphragm damper is disposed in the damping region, a filter bore is defined in the pump body, the filter bore connecting the inlet port chamber to the damping region and a filter element is disposed in the filter bore, the filter element filtering the fuel flowing from the inlet port chamber to the damping region, and the low-pressure connection bore and the filter bore intersect.

6. The high-pressure fuel pump according to claim 1, wherein:

the outlet is formed as an outlet port fixed to the pump housing, an outlet port chamber is defined between the pump housing and the outlet port, the outlet valve bore extends from the outlet port chamber and the pressure-limiting valve bore does not extend from the outlet port chamber, the pressure-limiting valve bore has a first exit side that is closed by a first ball or plug, and the outlet valve bore is connected to the pressure-limiting valve bore by a high-pressure connecting bore located in the high-pressure region.

7. The high-pressure fuel pump according to claim 6, wherein:

the pump housing comprises a pump body and a pump cover which are connected to one another, a damping region belonging to the low-pressure region is bounded by the pump body and the pump cover, at least one diaphragm damper is disposed in the damping region, and the high-pressure connecting bore extends from the damping region and has a second exit side that is closed with a second ball or a plug.

8. The high-pressure fuel pump according to claim 7, wherein the pressure-limiting valve bore is connected to the inlet port chamber through the low-pressure connection bore.

9. The high-pressure fuel pump according to claim 8, wherein the pressure-limiting valve bore and the low-pressure connection bore lie together in one plane and perpendicular to the longitudinal direction.

10. The high-pressure fuel pump according to claim 8, wherein:

a filter bore is defined in the pump body connecting the inlet port chamber to the damping region, a filter element is disposed in the filter bore, the filter element filtering the fuel flowing from the inlet port chamber to the damping region, and the low-pressure connection bore and the filter bore intersect.

11. The high-pressure fuel pump according to claim 1, wherein the outlet valve bore and the pressure-limiting valve bore are oriented at an angle different from 0° to one another.

12. The high-pressure fuel pump according to claim 11, wherein:

the outlet is formed as an outlet port fixed to the pump housing, and an outlet port chamber is formed between the pump housing and the outlet port, the pump housing comprises a pump body and a pump cover which are connected to one another, the pump body and the pump cover delimiting a damping region which belongs to the low-pressure region and in which at least one diaphragm damper is disposed, the pressure-limiting valve bore is a blind bore extending from the damping region, a low-pressure connecting bore and a high-pressure connecting bore branching off from the blind bore, the low-pressure connecting bore is located in the low-pressure region and opens into the inlet port chamber the high-pressure connecting bore is located in the high-pressure region and opens into the outlet port chamber, and the pressure-limiting valve bore has an exit side that is closed with a ball or a plug.

13. The high-pressure fuel pump according to claim 12, wherein the low-pressure connecting bore and the high-pressure connecting bore are oriented geometrically parallel to one another.

14. The high-pressure fuel pump according to claim 12, wherein the low-pressure connecting bore and the high-pressure connecting bore are oriented at an angle different from 0°.

15. The high-pressure fuel pump according to claim 1, wherein:

the pressure-limiting valve has a valve seat body which is pressed into the pressure-limiting valve bore or into a housing of the pressure-limiting valve and on which a tapered valve seat is formed, the pressure-limiting valve has a valve element which has the shape of a ball and which comes into sealing contact with the valve seat, the valve element is pressed in a closing direction by a holding element, the holding element is pressed in the closing direction by a spiral spring, the spiral spring is supported on a housing of the pressure-limiting valve or on the pump housing, the spiral spring bears against a radially outer region of the holding element and the spiral spring receives a radially inner region of the holding element.

16. The high-pressure fuel pump according to claim 14, wherein the low-pressure connecting bore and the high-pressure connecting bore are oriented at right angles to one another.

17. The high-pressure fuel pump according to claim 1, wherein the pressure-limiting valve bore and the outlet valve bore each open directly to the high-pressure region.

* * * * *